(12) United States Patent
Fimoff et al.

(10) Patent No.: US 7,035,353 B2
(45) Date of Patent: Apr. 25, 2006

(54) CHANNEL ESTIMATION METHOD BLENDING CORRELATION AND LEAST-SQUARES BASED APPROACHES

(75) Inventors: Mark Fimoff, Hoffman Estates, IL (US); Serdar Ozen, West Lafayette, IN (US); Michael D. Zoltowski, West Lafayette, IN (US)

(73) Assignee: Zenith Electronics Corporation, Lincolnshire, IL (US)

( * ) Notice: Subject to any disclaimer, the term of this patent is extended or adjusted under 35 U.S.C. 154(b) by 448 days.

(21) Appl. No.: 10/278,325

(22) Filed: Oct. 23, 2002

(65) Prior Publication Data

US 2003/0099309 A1 May 29, 2003

Related U.S. Application Data

(60) Provisional application No. 60/336,415, filed on Oct. 24, 2001.

(51) Int. Cl.
*H03D 1/00* (2006.01)
*H03D 1/04* (2006.01)

(52) U.S. Cl. ........................... 375/340; 375/346

(58) Field of Classification Search ............... 375/340, 375/341, 316, 346; 714/794, 795
See application file for complete search history.

(56) References Cited

U.S. PATENT DOCUMENTS

| | | | | |
|---|---|---|---|---|
| 5,903,610 | A | * | 5/1999 | Skold et al. ............... 375/285 |
| 6,470,225 | B1 | * | 10/2002 | Yutkowitz ................... 700/44 |
| 2003/0058787 | A1 | * | 3/2003 | Vandenameele-Lepla ... 370/206 |
| 2004/0209573 | A1 | * | 10/2004 | Happonen et al. ....... 455/67.11 |

FOREIGN PATENT DOCUMENTS

| | | |
|---|---|---|
| EP | 0 755 141 A2 | 1/1997 |
| WO | WO 98/38772 | 9/1998 |

OTHER PUBLICATIONS

Mark Fimoff et al., "Using 8-VSB Training Sequence Correlation as a Channel Estimate for DFE Tap Initialization", Proceedings of the 39th Annual Allerton Conference in Communications, Control and Computing, Sep. 2001.

ATSC Digital Television Standard (Annex D), Sep. 16, 1995, pp. 46-60.

Al-Sanie et al., "Blind channel estimation and data recovery in DS spread spectrum systems", Signal Processing, vol. 81, No. 8, August 2001, pp. 1705-1714.

* cited by examiner

*Primary Examiner*—Khai Tran

(57) ABSTRACT

A response of a channel may be estimated by correlating a received signal and a training sequence, by forming a matrix $\Gamma$ based on a desired shape for the peaks of the correlation, by extracting a vector y from the received signal, and by estimating the channel response from a least-squares solution based on the matrix $\Gamma$, the vector y, and a matrix formed from the elements of the known training sequence.

39 Claims, 3 Drawing Sheets

CHANNEL ESTIMATION METHOD BLENDING CORRELATION AND LEAST-SQUARES BASED APPROACHES

RELATED APPLICATIONS

The present application claims the benefit of Provisional Application Ser. No. 60/336,415 filed on Oct. 24, 2001.

TECHNICAL FIELD OF THE INVENTION

The present invention relates to a channel estimator and, more particularly, to a channel estimator that estimates the response of a channel through which signals are received.

BACKGROUND OF THE INVENTION

For communication systems utilizing a periodically transmitted training sequence, least-squares algorithms or correlation algorithms have been the most widely used alternatives for the estimation of the channel. The estimation of the channel may then be used for various purposes such as initializing the values of the taps of an equalizer at a receiver.

Both algorithms use a stored copy of the known transmitted training sequence at the receiver. The properties and length of the training sequence generally depend on the particular standard specifications of the communication system. In addition, a training sequence is also used in a communication system for synchronization to indicate the beginning and/or end of a transmitted data frame or packet.

In general, a communication system 10 that utilizes an equalizer adjusted by use of the training signal is shown in FIG. 1 and includes an equalizer 12 and a channel estimator 14 of a receiver. The base-band transmitted signal s(t) having a data rate of 1/T symbols per second is represented by the following equation:

$$s(t) = \sum_k I_k q(t-kT) \tag{1}$$

where $I_k \in A \equiv \{\alpha_1, \ldots, \alpha_M\} \subset C^1$ is the transmitted training sequence, which is a discrete M-ary sequence taking values on the generally complex M-ary alphabet A, which also constitutes a two dimensional modulation constellation. The function q(t) as shown in a block 16 represents the pulse shaping performed by a transmitter filter of finite support $[-T_q/2, T_q/2]$.

The overall complex pulse shape is denoted by p(t) and is given by the following equation:

$$p(t)=q(t)*q*(-t) \tag{2}$$

where q*(−t) shown in a block 18 is the receiver matched filter finite impulse response. Although it is not required, it is assumed, for the sake of simplifying the notation, that the span, $T_q$, of the transmitter and receiver filters is an integer multiple of the symbol period T; that is, $T_q=N_q T$, $N_q \in Z^+$.

The physical channel between the transmitter and the receiver is denoted by c(t,τ) and is shown by a block 20, and throughout the discussion below the concatenation of p(t) and the physical channel c(t,τ) will be denoted by h(t) and is defined by the following equation:

$$h(t)=q(t)*c(t,\tau)*q*(-t)=p(t)*c(t,\tau) \tag{3}$$

where h(t) is generally referred to as the channel response. The physical channel c(t,τ) between the transmitter and the receiver is generally described by the following impulse response:

$$c(t,\tau) = \sum_{k=-K}^{L} c_k(\tau)\delta(t-\tau_k) \tag{4}$$

which describes a time-varying channel, where $\{c_k(\tau)\} \subset C^1$, $-K \leq k \leq L$, and $t, \tau \in R$. However, it is assumed that the time-variation of the channel is slow enough that $c(t,\tau)=c(t)$ can be assumed to be a fixed (static) inter-symbol interference (ISI) channel throughout the training period; that is, it is assumed that $c_k(\tau)=c_k$, which in turn implies that c(t) is defined by the following equation:

$$c(t) = \sum_{k=-K}^{L} c_k \delta(t-\tau_k) \tag{5}$$

for $0 \leq t \leq NT$, where N is the number of training symbols.

The summation indices K and L, where K is the number of anti-causal multi-path delays and L is the number of causal multi-path delays, are dependent on the channel and are more fully explained below in the discussion of correlation based channel estimation and subsequently. The multi-path delays $\tau_k$ are not assumed to be at integer multiples of the sampling period T. Indeed, an accurate and robust way of recovering the pulse shape back into the concatenated channel estimate when the multi-path delays are not exactly at the sampling instants is disclosed herein.

Equations (3) and (5) can be combined according to the following equation:

$$h(t) = p(t)*c(t) = \sum_{k=-K}^{L} c_k p(t-\tau_k). \tag{6}$$

Because both p(t) and c(t) are complex functions, the overall channel impulse response h(t) is also complex. Therefore, p(t), c(t), and h(t) can be written as functions of their real and imaginary parts as given by the following equations:

$$p(t)=p_I(t)+jp_Q(t) \tag{7}$$

$$c(t)=c_I(t)+jc_Q(t) \tag{8}$$

$$h(t)=h_I(t)+jh_Q(t) \tag{9}$$

Substituting equations (7)–(9) into equation (6) produces the following equation:

$$\begin{aligned} h(t) &= p(t)*c(t) \\ &= (p_I(t)+jp_Q(t))*(c_I(t)+jc_Q(t)) \\ &= \underbrace{(p_I(t)*c_I(t) - p_Q(t)*c_Q(t))}_{h_I(t)} + \end{aligned} \tag{10}$$

-continued $$\underbrace{j(p_I(t)*c_Q(t) + p_Q(t)*c_I(t))}_{h_Q(t)}$$

The output matched filter 18 is denoted y(t) and is given by the following equation:

$$y(t) = \left(\sum_k I_k \delta(t-kT)\right)*h(t) + \tilde{v}(t) \qquad (11)$$

where $\tilde{v}(t)$ designates the complex noise process after the matched filter. As in the case of equations (7)–(9), y(t) can be written in terms of its real and imaginary parts as $y(t)=y_I(t)+jy_Q(t)$. Sampling the output of the matched filter 18 at the symbol rate using a sampler 22 produces the discrete-time representation of the overall communication system according to the following equation:

$$y[n] \equiv y(t)|_{t=nT} = \sum_k I_k h[n-k] + \tilde{v}[n]. \qquad (12)$$

The transmitted symbols are composed of frames (or packets) of length N', where the first N symbols are the training symbols $a_k$. Within a frame of length N', the symbols may be denoted by the following equation:

$$I_k = \begin{cases} a_k, & \text{for } 0 \le k \le N-1 \\ d_k, & \text{for } N \le n \le N'-1 \end{cases} \qquad (13)$$

where the distinction of the first N symbols is made to indicate that they are the known training symbols, and where it is possible that the training symbols $a_k$ belong to a subset of the M-ary constellation alphabet A; that is $\{a_k \in \tilde{A} \subset A \equiv \{\alpha_1, \ldots, \alpha_M\}\}$. In fact, for the 8-VSB digital television system, the signal alphabet is $A \equiv \{\pm 1, \pm 3, \pm 5, \pm 7\}$, while the training sequence can only take binary values within the subset $\tilde{A} \equiv \{-5, +5\}$.

FIG. 2 shows a least-squares channel estimator 30 that has been used for the channel estimator 14 of FIG. 1. In order to fully estimate the channel defined by equation (6), the least-squares based channel estimation algorithm assumes that the starting point and the ending point of the channel taps are either known or can be bounded. This assumption plays a critical role in the overall quality and robustness of the least-squares estimation procedure. It can be equivalently assumed that the impulse responses of the discrete-time equivalent composite channel h[n] can be written as a finite dimensional vector according to the following equation:

$$h = [h[-N_a], h[-N_a+1], \ldots, h[-1], h[0], h[1], \ldots, h[N_c-1], h[N_c]]^T \qquad (14)$$

where $N_a$ denotes the number of anti-causal taps of the channel, $N_C$ denotes the number of causal taps of the channel, and $N_a + N_C + 1$ is the total memory of the channel.

Based on equation (12) and assuming that $N \ge N_a + N_c + 1$ where N again is the number of training symbols, the output of the matched filter 18 corresponding to the known training symbols can be written as follows:

$$y[N_c] = h[-N_a]a_{N_c+N_a} + \ldots + h[0]a_{N_c} + \ldots + h[N_c]a_0 + \tilde{v}[N_c]$$

$$y[N_c+1] = h[-N_a]a_{N_c+N_a+1} + \ldots + h[0]a_{N_c+1} + \ldots + h[N_c]a_1 + \tilde{v}[N_c+1]$$

$$\vdots$$

$$y[N-1-N_a] = h[-N_a]a_{N-1} + \ldots + h[0]a_{N-1-N_a} + \ldots + h[N_c]a_{N-1-N_a-N_c} + \tilde{v}[N-1-N_a]$$

which can be compactly written according to the following vector equation:

$$y = Ah + \tilde{u} \qquad (15)$$

where y comprises values extracted by a sample extractor 32 from the received signal and is defined according to the following equation:

$$y = [y[N_c], y[N_c+1], \ldots, y[N-1-N_a]]^T \qquad (16)$$

where A is based on the training signal and is defined according to the following equation:

$$A = \begin{bmatrix} a_{N_c+N_a} & a_{N_c+N_a-1} & \cdots & a_0 \\ a_{N_c+N_a+1} & a_{N_c+N_a} & \cdots & a_1 \\ \vdots & \vdots & \ddots & \vdots \\ a_{N-1} & a_{N-2} & \cdots & a_{N-1-N_a-N_c} \end{bmatrix}_{(N-N_a-N_c) \times (N_a+N_c+1)} \qquad (17)$$

and where $\tilde{v}$ is defined according to the following equation:

$$\tilde{v} = [\tilde{v}[N_c], \tilde{v}[N_c+1], \ldots, \tilde{v}[N-1-N_a]]^T.$$

As long as the matrix A is a tall matrix and of full column rank such that $N \ge 2(N_a + N_c) + 1$ and rank $\{A\} = N_a + N_c + 1$, then the least-squares solution which minimizes the objective function given by the following equation $$J_{LS}(h) = \|y - Ah\|^2 \qquad (18)$$

exists and is unique and is given by the following equation:

$$\hat{h}_{LS} = (A^H A)^{-1} A^H y \qquad (19)$$

where the superscript H denotes Hermitian transpose, and where $\hat{h}_{LS}$ is the least-squares estimation of the channel between the transmitter and the receiver. Thus, in accordance with equation (19), a matrix multiplier 34 multiplies the matrix y by a matrix $A^+$, which is $(A^H A)^{-1} A^H$ and which is stored in a memory 36. Thus, the matrix multiplier produces the channel estimate $\tilde{h}_{LS}$ according to equation (19).

One of the problems associated with the least-squares based channel estimation is the uncertainty associated with the actual channel spread, i.e., the spread between the outermost multi-paths. That is, this uncertainty arises because the channel memory and the first and last channel taps are not actually known by the receiver. Therefore, in order to set up equations (16)–(19), some sort of preprocessing is needed, such as correlating the stored training symbols with the received signal, or some pre-assumed starting and ending points for the channel must be used such that the total channel spread is not too long that would otherwise result in the A matrix being a wide matrix rather than a tall one.

Even if the starting and ending points of the actual channel spread are known by the receiver, least-squares based channel estimators still have problems that may be insurmountable. For example, least-squares channel estimators cannot properly estimate the channel from the training sequence if the channel spread is too long for the training sequence to effectively support the channel.

That is, if $N<2(N_a+N_c)+1$, such that the number of training symbols is insufficient to support, or create, an over-determined channel convolution matrix A, then there are two cases to consider.

First, if the full A matrix as given by equation (17) is used, the least-squares estimate of equation (19) no longer exists. That is, the matrix $A^H A$ is singular.

Second, if the receiver does not attempt to construct the full A matrix and instead constructs an alternative thinner matrix $\tilde{A}$ with $N \geq 2(\tilde{N}_a+\tilde{N}_c)+1$ such that $\tilde{N}_a<N_a$ and/or $\tilde{N}_c<N_c$, then the inverse of $\tilde{A}^H \tilde{A}$ will exist but the new least-squares solution given by the following equation:

$$\tilde{h}_{LS}=(\tilde{A}^H \tilde{A})^{-1}\tilde{A}^H y$$

will not be a very desirable estimate. That is, the resulting channel estimate no longer resembles the actual channel, especially if the actual channel spread is much longer that the training sequence can support.

An example is illustrated in FIGS. 3(a)–3(e). A channel with delays $\tau_k$=[−105.32, −87.643, −45.443, 0, 12.22, 39.9, 203.659, 321.82, 435.12] with a complex raised cosine pulse shape of 41 samples (a channel spread of 580 symbols including the tails of the pulse shape) was simulated. The real part of the channel impulse response seen at the output of the matched filter is shown in FIG. 3(a). As shown in FIG. 3(a), each peak of the channel impulse response has a raised cosine pulse shape. The training sequence is the same as in the 8 VSB digital television standard and is of length N=704 symbols. With 704 training symbols, a channel with a maximum delay spread of only $N_a+N_c+1$=352 taps, including the tails of the pulse shape, can be supported. Thus, the actual channel has a much longer delay spread than the standard least-squares based method can handle. The least-squares channel estimate corresponding to cases where the receiver constructs a smaller convolution matrix $\tilde{A}$ with $-\tilde{N}_a$=−125, $\tilde{N}_c$=60, $-\tilde{N}_a$=−125, $\tilde{N}_c$=120, $-\tilde{N}_a$=−125, $\tilde{N}_c$=206, and $-\tilde{N}_a$=−125, $\tilde{N}_c$=342 are shown in FIG. 3(b), FIG. 3(c), FIG. 3(d), and FIG. 3(e), respectively. The matrix $\tilde{A}$ is non-singular for all cases except FIG. 3(e). As can be seen from FIG. 3(b) to FIG. 3(d), as the assumed channel spread gets longer, the estimated channel response increasingly deviates from the original channel response. In FIG. 3(e), where $\tilde{A}$ is undetermined, the estimated channel no longer resembles the original channel response. However, it may be misleading to assume a very short channel spread in order to obtain a cleaner channel estimate within the assumed channel span. In that case, it is very likely that very significant early pre-cursor multi-paths or late post-cursor multi-paths may be missing.

As indicated above, it is also known to apply auto-correlation in estimating the channel. The sampled received sequence at the output of the matched filter is denoted by y[n] and is given in equation (12), where the pre-cursor symbols are at positions $n \geq 0$ and post-cursor symbols are at positions n<0. The known training sequence is denoted by $s[n]=a_n$ for n=0, . . . , N−1. The auto-correlation functions $r_s[m]$ and $r_{sy}[m]$ are defined in accordance with the following equations:

$$r_s[m] = \sum_{k=0}^{N-1} s^*[k]s[k+m] \quad (20)$$

$$r_{sy}[m] = \sum_{k=0}^{N-1} s^*[k]y[k+m] \quad (21)$$

where $\{s[k] \in \tilde{A}\}$.

It is assumed that, in order to be able to use correlation based channel estimation, the training sequence must belong to a certain class of sequences and thereby possess certain desirable properties. An exemplary class of sequences is maximal length pseudo-noise (PN) sequences. A PN-sequence of length n is denoted herein as $PN_n$. In general, the periodic auto-correlation of a binary valued ({+A, −A}) $PN_n$ sequence is given by the following equation:

$$r_{PN_n}[m] = \begin{cases} A^2 n, & \text{if } m = 0, \pm n, \pm 2n, \ldots \\ -A^2, & \text{otherwise} \end{cases} \quad (22)$$

FIG. 4 shows a correlation channel estimator 40 that can be used for the channel estimator 14 to estimate the channel in order to initialize the equalizer 12. The correlation channel estimator 40 includes a cross-correlator 42 that cross-correlates the received signal with the training sequence stored in a memory 44 and a level thresholder 46 that sets to zero any correlation coefficients that are below a predetermined threshold. Accordingly, the correlation channel estimator 40 produces a channel estimate $\tilde{h}$.

More specifically, based on the auto-correlation property of equation (22), the channel can be estimated by cross-correlating s[n] (the training sequence known and stored in the receiver) with the received sequence y[n]. The initial pre-cursor impulse response estimate $\tilde{h}_a[n]$ is determined from the cross-correlation of the training sequence s[n] stored in the receiver and the actual received symbols at lags from 0 to −N+1 with respect to the start of the received training sequence. That is, $\tilde{h}_a[n]$ is given by the following equation:

$$\tilde{h}_a[n] = \frac{1}{r_s[0]} \sum_{k=0}^{N-1} s^*[k]y[k+n] \quad (23)$$

for lags $n = 0, -1, \ldots, -N+1$

Similarly, the initial post-cursor response estimate $\tilde{h}_c[n]$ is determined from the cross-correlation of the training sequence stored in the receiver and the actual received symbols at lags from 1 to N−1 with respect to the start of the received training sequence. That is, $\tilde{h}_c[n]$ is given by the following equation:

$$\tilde{h}_c[n] = \frac{1}{r_s[0]} \sum_{k=0}^{N-1} s[k] y^*[k+n] \quad (24)$$

for lags $n = 1, 2, \ldots, N-1$ where $r_s[0]$ in equations (23) and (24) is defined according to the following equation:

$$r_s[0] = \sum_{k=0}^{N-1} \|a_k\|^2$$

Equations (23) and (24) imply that the correlations should be extended on either side by the length of the training sequence in order to obtain the longest possible channel estimate within the limits of the transmission standard, with the assumption that $N \geq K$ and $N \geq L$.

With respect to the channel estimation procedure given by equations (23) and (24), the overall initial estimated channel transfer function $\tilde{H}(z)$ is given by the Z-transform of the concatenated channel estimates according to the following equation:

$$\tilde{H}(z) = \sum_{k=-N+1}^{0} \tilde{h}_a[k] z^{-k} + \sum_{k=1}^{N-1} \tilde{h}_c[k] z^{-k} \quad (25)$$

$$= \sum_{k=-N+1}^{N-1} \tilde{h}[k] z^{-k}$$

where the concatenated estimated channel impulse $\tilde{h}[n]$ is given by the following equation:

$$\tilde{h}[n] = \begin{cases} \tilde{h}_a[n], & \text{for } -N+1 \leq n \leq 0 \\ \tilde{h}_c[n], & \text{for } 1 \leq n \leq N-1 \end{cases} \quad (26)$$

Equation (25) can be rewritten in accordance with the following equation:

$$\tilde{H}_u(z) = \frac{1}{r_s[0]} \breve{A}^{-H} \tilde{y} z^{-k} \quad (27)$$

where $\breve{A}$ is a $(N+N_a+N_C)$ by $(N_a+N_C+1)$ Toeplitz matrix with a first column $[a_0, a_1, \ldots, a_{N-1}, 0, \ldots, 0]^T$ and a first row $[a_0, 0, \ldots, 0]^T$, and where $\tilde{y} = [y[-N_a], \ldots, y[N+N_C-1]]^T$. In order to get rid of the side lobes of the aperiodic autocorrelation, the autocorrelation of the training sequence is determined according to the following equation:

$$R_{aa} = \frac{1}{r_s[0]} \breve{A}^H \breve{A} \quad (28)$$

and then $R_{aa}$ can be inverted and applied to $\tilde{H}_u(z)$ according to the following equation:

$$\tilde{H}_c(z) = R_{aa}^{-1} \tilde{H}_u(z) \quad (29)$$

However, the channel estimate $\tilde{H}_c(z)$ obtained by equation (29) has the contributions due to unknown symbols prior to and after the training sequence, as well as the additive channel noise; only the side lobes due to the aperiodic correlation is removed.

As discussed below, the correlations of equations (23) and (24) will clearly yield peaks at $\{D_k^a \in Z^+$, for $k=-K, \ldots, -1, 0\}$, and at $\{D_k^c \in Z^+$, for $k=1, \ldots, L\}$. These delays $D_k^a$ and $D_k^c$ are the sampling instants closest to the locations of the actual physical channel multi-path delays $\tau_k$ for $k=-K, \ldots, -1, 0, 1, \ldots, L$ within a symbol interval.

As shown in FIG. 4, there is a level thresholding algorithm following right after the cross-correlations such that the estimated channel taps are set to zero if they are below a certain threshold. This thresholding algorithm operates in accordance with the following equation:

$$\text{set } \tilde{h}_c[n] = \begin{cases} 0, & \text{if } \tilde{h}_c[n] < \varepsilon \\ \tilde{h}_c[n], & \text{otherwise} \end{cases} \quad (30)$$

for $n=-N+1, \ldots, -1, 0, 1, \ldots, N-1$, where the subscript c denotes that the corresponding function has been cleansed of side lobes. As a result, the estimated transfer function $\hat{H}_c(z)$ after thresholding can, in general, be written according to the following equation:

$$\hat{H}_c(z) = \tilde{\beta}_K z^{D_K^a} + \cdots + \tilde{\beta}_2 z^{D_2^a} + \tilde{\beta}_1 z^{D_1^a} + \tilde{\alpha}_0 + \tilde{\alpha}_1 z^{-D_1^c} + \quad (31)$$

$$\tilde{\alpha}_2 z^{-D_2^c} + \cdots + \tilde{\alpha}_L z^{-D_L^c}$$

$$= \tilde{\alpha}_0 \left( \beta_K z^{D_K^a} + \cdots + \beta_1 z^{D_1^a} + \alpha_1 z^{-D_1^c} + \cdots + \alpha_L z^{-D_L^c} \right)$$

where $\alpha_i = \tilde{\alpha}_i / \tilde{\alpha}_0$ for $1 \leq i \leq L$, and $\beta_k = \tilde{\beta}_k / \tilde{\alpha}_0$ for $1 \leq k \leq K$. The notation of equation (31) is adopted because, after thresholding, there are usually very few dominant taps. Accordingly, the channel after correlation and thresholding is sparse. Moreover, the peaks in the channel estimate no longer have the pulse shapes of the actual channel response.

In equation (31), the coefficients $\beta_k$ correspond to the post-cursor (causal) part of the correlation, and the coefficients $\alpha_l$ correspond to the pre-cursor (anti-causal) part of the correlation. The delays $D_k^a$ are the anti-causal delays, and the delays $D_l^c$ are the causal delays. As a convention, it is assumed that $1 \leq D_1^c < D_2^c < \ldots < D_L^c$ and similarly that $1 \leq D_1^a < D_2^a < \ldots < D_K^a$. Also, by the construction of the channel estimates in equations (23) and (24), $D_K^a \leq N-1$ and $D_L^c \leq N-1$.

At this point, the causal part $\hat{H}_{cc}$ and the anti-causal part $\hat{H}_{ac}$ of the transfer function of equation (31) can be defined in accordance with the following equations:

$$\hat{H}_{ac}(z) = \tilde{\alpha}_0 (\beta_K z^{D_{aK}} + \ldots + \beta_2 z^{D_2^a} + \beta_1 z^{D_1^a} + 1) \quad (32)$$

$$\hat{H}_{cc}(z) = \tilde{\alpha}_0 (\alpha_1 z^{-D_1^c} + \alpha_2 z^{-D_2^c} + \ldots + \alpha_L z^{-D_L^c}) \quad (33)$$

such that $\hat{H}_c(z) = \hat{H}_{ac}(z) + \hat{H}_{cc}(z)$. Again the first subscript denotes whether the part is anti-causal or causal, and the second subscript denotes that the part has been cleansed of the side lobes. The partition of equations (32) and (33) enable the development of the appropriate feed-forward filter initializations for a Decision Feedback Equalizer (DFE).

Unfortunately, if the PN training sequence is finite and the standard linear correlation is used, the auto-correlation values corresponding to the non-zero lags will not be constant and will not be as low as $-A^2$. As a simple illustration, a sequence composed of six $PN_{511}$ appended back to back may be considered so that the sequence is given by the following equation:

$$y = [PN_{511}, PN_{511}, PN_{511}, PN_{511}, PN_{511}, PN_{511}] \quad (34)$$

Then, $r_{xy}[m]$, with $x = [PN_{511}]^T$, will be given as shown in FIG. 5. A low correlation value of $-A^2$ will be obtained for lags that are not multiples of L=511 corresponding to the intermediate $PN_{511}$ portions of the long sequence y. However, as illustrated in FIG. 5, for the outermost lags, this constant and low correlation value of $-A^2$ will not be obtained. Instead, these correlation tails are noise like due to the finiteness of the training sequence. That is, the stored training sequence is correlated not only with the training sequence in the received signal but also with random data symbols and reserved symbols.

The training sequence that is used for digital television is given by the following equation:

$$\tilde{s}=[ss,PN_{511},PN_{63},\pm PN_{63},PN_{63}]^T$$

where ss=[+5−5−5+5] represents the four segment sync symbols at the beginning of the frame sync segment. There are also reserved frame bits and data bits right before and after the training sequence $\tilde{s}$.

In summary, the correlations of the received signal with the stored training sequence will be noisy because the PN sequences are finite in length so that they will not achieve the desired low correlation values for non-zero lags, and because the span of the cross-correlation includes the known training sequence as well as random data symbols and reserved symbols.

Because of these reasons, the initial estimate of the channel that is acquired from the correlation of the matched filter output with the stored training sequence will not yield a clean and accurate channel estimate. Accordingly, even if the channel tap estimates $\{\alpha_k,\beta_k\}$ are scaled properly, they will not be very close to the actual channel tap values $\{c_k p(0)\}$ due to the reasons given above as well as due to the fact that there may also be tap values in the tails of the adjacent multi-paths. Hence, both the amplitudes and phases of the estimated tap values may be incorrect.

Moreover, after the thresholding takes place, the most likely result is that the thresholded correlation will include only the peaks of the channel taps, which implies that the tails of the raised cosine pulse shape that are under the noisy correlation output may be eliminated entirely. This elimination of the tails may lead to critical performance loss in the initialization of the equalizer 12 and a slower convergence onto the correct tap values for the equalizer 12 after initialization.

The present invention mitigates the problems of the least-squares channel estimators and the correlation channel estimators providing a channel estimator that is a blend of a least-squares channel estimator and a correlation channel estimator.

SUMMARY OF THE INVENTION

In accordance with one aspect of the present invention, a method for determining a channel response comprises the following: determining a matrix $\Gamma$ based on a correlation of a received signal and a known training sequence; extracting a vector y from a received signal; and, estimating the channel response from a least-squares solution based on the matrix $\Gamma$, the vector y, and a matrix A formed from the elements of the known training sequence.

In accordance with another aspect of the present invention, a method for determining a channel response comprises the following: determining a matrix $\Gamma$ based on a correlation of a received signal and a known training sequence; extracting a vector y from a received signal; determining an unknown coefficient vector $\gamma_{LS}$ according to the following equation:

$$\gamma_{LS}=(\Gamma^H A^H A\Gamma)^{-1}\Gamma^h A^H y$$

wherein the unknown coefficient vector $\gamma_{LS}$ comprises a least-squares solution of the following equation:

$$y=A\Gamma\gamma+v$$

and wherein A comprises a matrix based on the training sequence; and, determining a channel response according to the following equation:

$$\hat{h}_{new}=\Gamma\gamma_{LS}.$$

In accordance with still another aspect of the present invention, a method for determining a channel response comprises the following: correlating a received signal with a training sequence; constructing a matrix $\Gamma$ by approximating a desired pulse shape for each peak of the correlation; constructing a matrix A based on the training sequence; solving a least-squares solution of the following equation in order to derive an unknown coefficient vector $\gamma$:

$$y=A\Gamma\gamma$$

wherein y is a vector representing a received signal; and, determining the channel response from the unknown coefficient vector $\gamma$ and the matrix $\Gamma$.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
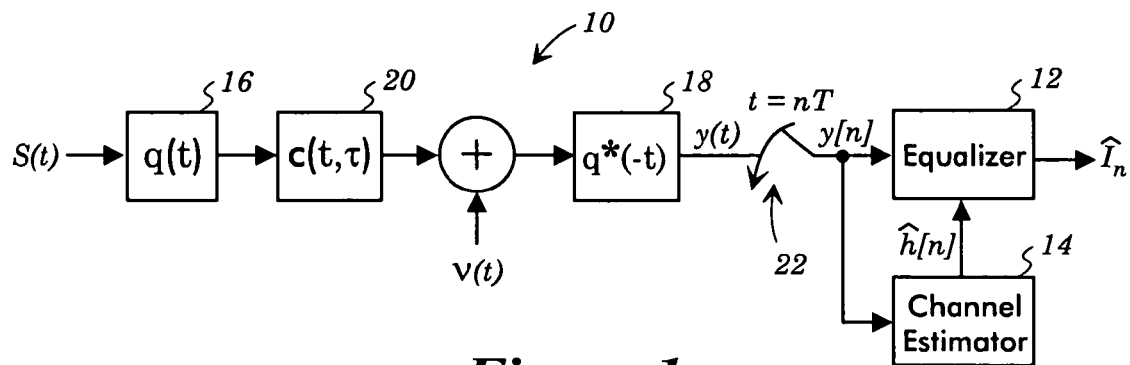
FIG. 1 illustrates a generalized system whose equalizer is initialized by a channel estimator.
Figure 2:
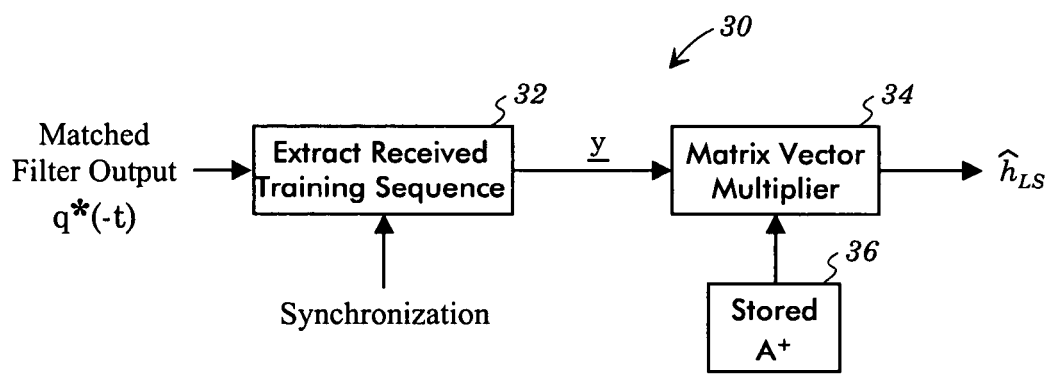
FIG. 2 illustrates a least-squares channel estimator that has been used for the channel estimator of FIG. 1.
Figure 4:
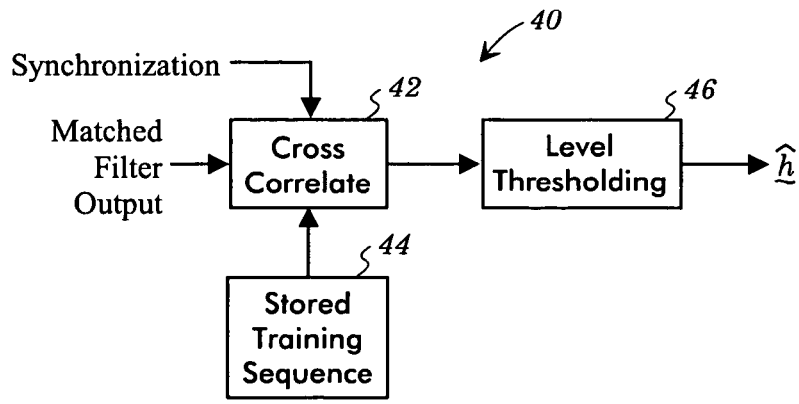
FIG. 4 illustrates a correlation channel estimator that has been used for the channel estimator of FIG. 1.
Figure 3A:
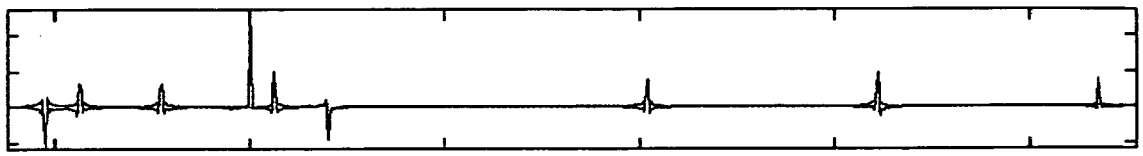
FIGS. 3(a)–3(e) illustrate an exemplary simulation useful in explaining problems associated with the least-squares channel estimator of FIG. 2.
Figure 3B:
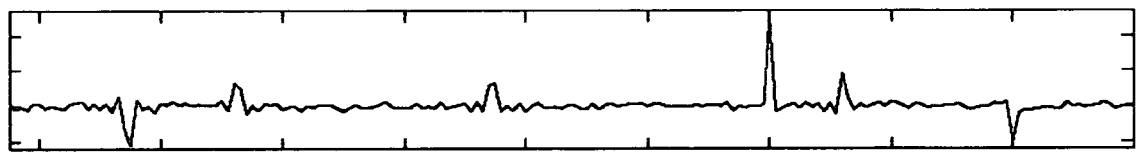
Figure 3C:
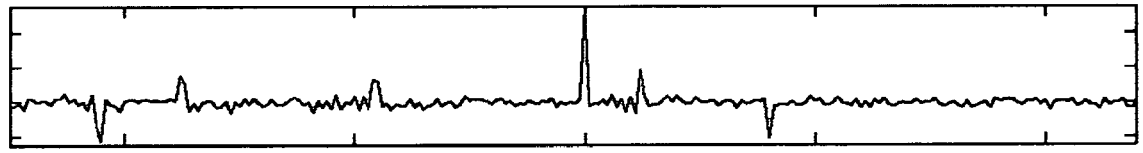
Figure 3D:
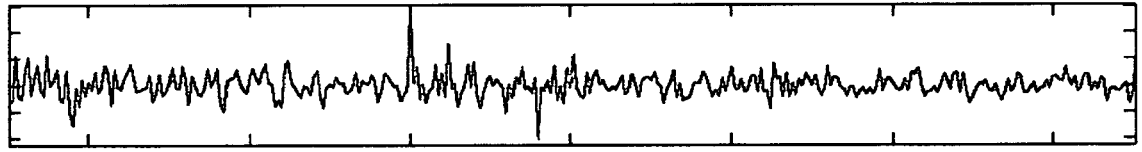
Figure 3E:
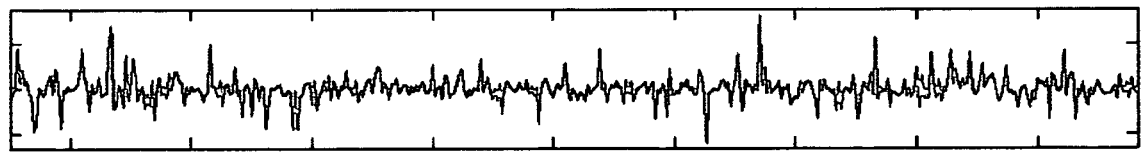
Figure 5:
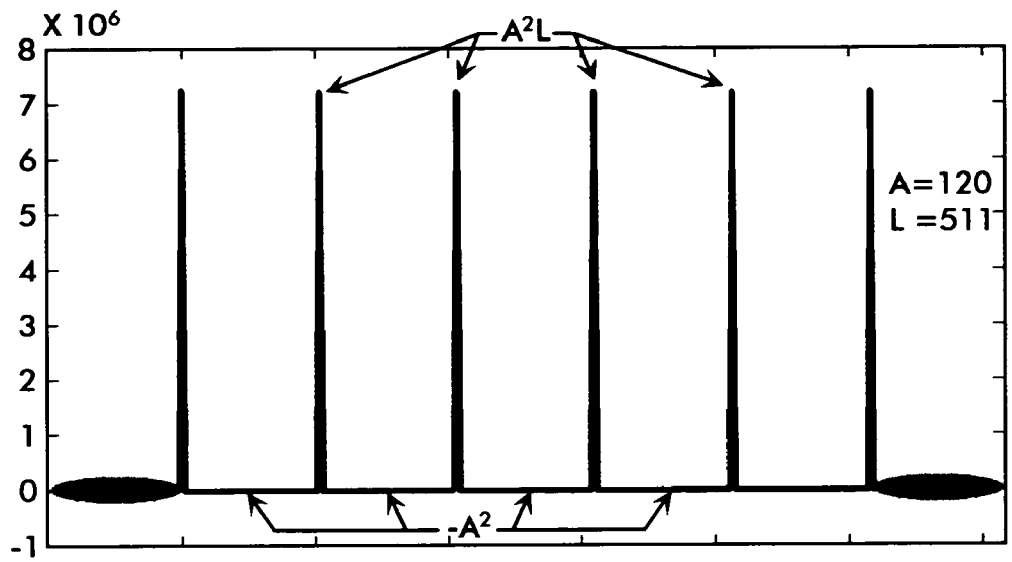
FIG. 5 illustrates an exemplary simulation useful in explaining problems associated with the correlation channel estimator of FIG. 4; and, FIG. 6 illustrates a channel estimator according to an embodiment of the present invention that is a blend of a least-squares channel estimator and a correlation channel estimator.
Figure 6:
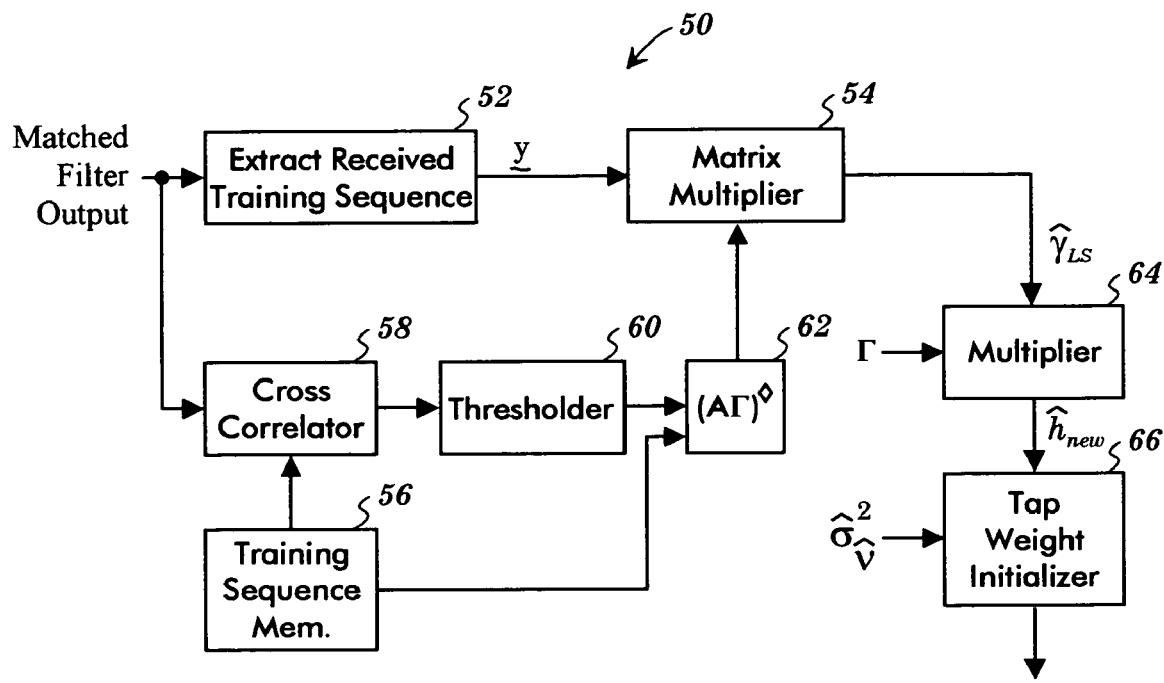

FIG. 6 illustrates a blended channel estimator 50 having a sample extractor 52, a matrix multiplier 54, a training sequence memory 56 that stores a training sequence, a cross-correlator 58, a level thresholder 60, a combiner unit 62, a multiplier 64, and a tap weight initializer 66. The sample extractor 52 extracts values y from the output of a receiver's matched filter, and the matrix multiplier 54 multiplies the extracted values y by a matrix $(A\Gamma)^\diamond$, where the matrix $(A\Gamma)^\diamond$ is calculated by the combining unit 62 in the manner described below. The cross-correlator 58 cross-correlates the received signal with the stored training sequence stored in the memory 56 and the resulting cross-correlation is thresholded by the level thresholder 60 so that the combining unit 62 can construct the matrix $(A\Gamma)^\diamond$ from the output of the level thresholder 60 and the training sequence stored in the memory 56.

Thus, the blended estimation procedure illustrated by FIG. 6 starts from the exact same steps of the correlation based estimation as outlined by equations (23) and (24), and then the thresholding step is performed on the channel estimate as indicated by equation (27) in order to clean up the noise in the channel estimate. These steps produce the cleaned channel estimate $\hat{H}_c(z)$ shown in Equation (31). In equation (31), the value 1 denotes the main signal and the other values in equation (2) denote multi-paths. Equivalently, the cleaned channel impulse response estimate can be represented as shown in the following equation:

$$\hat{h}_c = \tilde{\alpha}_0 [\beta_K, \underbrace{0, \cdots, 0,}_{D_K^a - D_{K-1}^a - 1 \text{ zeros}} \beta_{K-1}, \cdots, \beta_1, \underbrace{0, \cdots, 0,}_{D_1^a - 1 \text{ zeros}} \underbrace{0, \cdots, 0,}_{D_1^c - 1 \text{ zeros}} \alpha_1, \cdots, \alpha_{L-1}, \underbrace{0, \cdots, 0,}_{D_L^c - D_{L-1}^c - 1 \text{ zeros}} \alpha_L]^T \quad (35)$$

where the zeros represent the spaces between the peaks. The structure and notation of equations (31) and (35) are important to the derivation of the algorithm below.

As indicated above, the pulse shape p(t) is convolved by the physical channel c(t) according to equation (6). As also indicated above, this pulse shape is lost due to the correlation and thresholding process. Therefore, it is desirable to recover this pulse shape for each of the multi-paths. Accordingly, the shifted and scaled copies of the pulse shape p(t) (shifted by $\tau_k$ and scaled by $c_k$) may be approximated by a linear combination of three pulse shape functions shifted by half a symbol interval (T/2). This linear combination is given by the following equation:

$$c_k p(nT - \tau_k) \approx \begin{cases} \sum_{l=-1}^{1} \gamma_l^{(k)} p\left(\left(n + D_k^a - \frac{l}{2}\right)T\right) & -K \leq k \leq -1 \\ \sum_{l=-1}^{1} \gamma_l^{(k)} p\left(\left(n - D_k^c - \frac{l}{2}\right)T\right) & 1 \leq k \leq L \end{cases} \quad (36)$$

where $\{\gamma_l^{(k)}, K \leq k \leq L\}_{l=-1}^{1} \subset C^1$. The last part of equation (36) contains an approximation of the pulse shape of the transmitter/receiver filter combination. By making this approximation, the tails of the complex pulse shape p(t) can be efficiently recovered even though these tails are buried under the noisy output of the correlation processing and are lost when uniform thresholding is applied.

To arrive at this approximation, three vectors $p_k$ are introduced for k=−1, 0, +1, each containing T spaced samples of the complex pulse shape p(t) shifted by kT/2 (for k=−1, 0, +1) according to the following three equations:

$$p_{-1} = \left[p\left(-N_q T + \frac{T}{2}\right), \cdots, p\left(-T + \frac{T}{2}\right), p\left(\frac{T}{2}\right), p\left(T + \frac{T}{2}\right), \cdots, p\left(N_q T + \frac{T}{2}\right)\right]^T \quad (37)$$

$$p_0 = [p(-N_q T), \cdots, p(-T), p(0), p(T), \cdots, p(N_q T)]^T \quad (38)$$

$$p_1 = \left[p\left(-N_q T - \frac{T}{2}\right), \cdots, p\left(-T - \frac{T}{2}\right), p\left(-\frac{T}{2}\right), p\left(T - \frac{T}{2}\right), \cdots, p\left(N_q T - \frac{T}{2}\right)\right]^T \quad (39)$$

By concatenating these vectors, a $(2N_q+1) \times 3$ matrix P is defined according to the following equation:

$$P = [p_{-1}, p_0, p_1] \quad (40)$$

This vector represents shifted and sampled values of a raised cosine pulse.

A matrix Γ whose columns are composed of the shifted vectors $p_k$, where the shifts represent the relative delays of the multi-paths. This matrix Γ is given by the following equation:

$$\Gamma = \begin{bmatrix} P & 0_{(D_K^a - D_{K-1}^a) \times 3} \\ 0_{(D_K^a + D_L^c) \times 3} & P & \ddots & 0_{D_K^a \times 3} \\ & 0_{(D_L^c + D_{K-1}^a) \times 3} & P & 0_{(D_K^a + D_{L-1}^c) \times 3} \\ & & 0_{D_L^c \times 3} & \ddots & P & 0_{(D_K^a + D_L^c) \times 3} \\ & & & 0_{(D_L^c - D_{L-1}^c) \times 3} & P \end{bmatrix} \quad (41)$$

where Γ is of dimension $(D_K^a + D_L^c + 2N_q + 1)$ by $3(K+L+1)$ dependent on the channel spread, and $0_{m \times n}$ denotes an m by n zero matrix such as a $D_K^a - D_{K-1}^a$ by 3 matrix of zeros. The received signal vector y and the training sequence vector A are defined by equations (16) and (17), respectively. Because of the assumption that q(t) spans $N_q$ symbol durations, q[n] has $N_q + 1$ sample points and p[n] in turn has $2N_q + 1$ samples. Therefore, $N_a = D_K^a + N_q$ and $N_c = D_L^c + N_q$.

An unknown vector γ is defined in accordance with the following equation:

$$\gamma = [\gamma^{(-K)}, \ldots, \gamma^{(0)}, \ldots, \gamma^{(L)}]^T \quad (42)$$

where $\gamma^{(k)} = [\gamma_{-1}^{(k)}, \gamma_0^{(k)}, \gamma_1^{(k)}]$ for $-K \leq k \leq L$. The unknown vector γ has coefficients $\{\gamma_{-1}^{-K}$ where n=−1, 0, 1, and where k=−K, …, 0, …, L and has a length of 3(K+L+1). Similarly to equation (15), the vector y representing the output of the receiver's matched filter may be given by the following equation:

$$y = A\Gamma\gamma + \nu \quad (43)$$

where ν is the observed noise vector. Using a least-squares solution, the unknown coefficient vector γ can be estimated in accordance with the following equation:

$$\hat{\gamma}_{LS} = (\Gamma^H A^H A \Gamma)^{-1} \Gamma^H A^H y = (A\Gamma)^\diamond y \quad (44)$$

Once the least-squares estimated vector $\gamma_{LS}$ is obtained, the new channel estimate $\hat{h}_{new}$, where the pulse tails are recovered, can simply be obtained in accordance with the following equation:

$$\hat{h}_{new} = \Gamma \hat{\gamma}_{LS} \quad (45)$$

The multiplier 64 multiplies $\hat{\gamma}_{LS}$ from the matrix multiplier 54 by Γ according to equation (45) in order to produce $\hat{h}_{new}$. Equations (44) and (45) may be solved using either a singular value decomposition (SVD) method, by a conjugate gradient (CG) method, or by any other suitable method.

Once the new estimated channel vector is determined per equation (45), the reconstructed vector at the output of the receiver matched filter can be defined, based on $\hat{h}_{new}$ according to the following equation:

$$\tilde{y} = A\hat{h}_{new} \quad (46)$$

$$\tilde{y} = A\Gamma\hat{\gamma}_{LS} \quad (47)$$

$$\tilde{y} = A\Gamma(\Gamma^H A^H A\Gamma)^{-1}\Gamma^H A^H y \quad (48)$$

The variance of the noise samples at the output of the receiver's matched filter, $\sigma_{\tilde{v}}^2$, can be estimated based on the following equation:

$$\hat{\sigma}_{\tilde{v}}^2 = \frac{1}{N - D_K^a - N_L^c} \|\tilde{y} - y\|^2 \quad (49)$$

which arises naturally. The length of the vector Y is $N - D_K^a - D_L^c$.

The tap weight initializer 66 may then initialize the tap weights of the taps of the equalizer 12 using the channel estimate $\hat{h}_{new}$ and the noise variance $\hat{\sigma}_{\tilde{v}}^2$ in a manner that is known in the art.

When the present invention is used to initialize the taps weights of the taps of an equalizer, the noise variance given by equation (49) and the new channel response given by equation (45) can be combined in any known way so as to produce the initial tap weights for the taps of the equalizer. Alternatively, instead of combining the noise variance given by equation (49) and the new channel response given by equation (45), a small non-zero value noise variance may be assumed and this assumed value may be combined with the new channel response given by equation (45) so as to produce the initial tap weights for the taps of the equalizer.

Modifications of the present invention will occur to those practicing in the art of the present invention. For example, the present invention as described above relies on the use of a training signal. However, other signals, such as data signals, can be used to implement the present invention. Also, although the invention is specifically shown for use in initializing the taps of an equalizer, the channel estimate produced in accordance with the present invention can be used for other purposes.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

The invention claimed is:

1. A method for determining a channel response comprising:
   determining a matrix $\Gamma$ based on a correlation of a received signal and a known training sequence;
   extracting a vector y from a received signal; and,
   estimating the channel response from a least-squares solution based on the matrix $\Gamma$, the vector Y, and a matrix A formed from the elements of the known training sequence, wherein the channel response has a pulse shape, and wherein the matrix $\Gamma$ is constructed so as to approximate the pulse shape of the channel response.

2. The method of claim 1 wherein the matrix $\Gamma$ comprises three sets of samples derived from the pulse shape, wherein the samples have a period T, wherein the first set comprises the pulse shape samples shifted by +T/2, wherein the second set comprises the pulse shape samples not shifted, and wherein the third set comprises the pulse shape samples shifted by −T/2.

3. The method of claim 2 wherein the pulse shape from which the samples are derived comprises a complex raised cosine pulse shape.

4. The method of claim 1 wherein the least-squares solution is solved using a singular value decomposition method.

5. The method of claim 1 wherein the least-squares solution is solved using a conjugate gradient method.

6. The method of claim 1 further comprising determining initial tap weights for an equalizer based on the channel response.

7. The method of claim 6 further comprising determining the initial tap weights for the equalizer based on the channel response and a noise variance $\sigma_{\tilde{v}}^2$ given by the following equation:

$$\hat{\sigma}_{\tilde{v}}^2 = \frac{1}{N - D_K^a - N_L^c} \|\tilde{y} - y\|^2$$

wherein D denotes distance between peaks of the correlation, wherein the superscript a denotes a distance of a corresponding anti-causal peak, wherein the superscript c denotes a distance of a corresponding causal peak, wherein K denotes the number of anti-causal peaks, wherein L denotes the number of causal peaks, wherein N denotes a number of training symbols in the training sequence, and wherein $\hat{y}$ is based on the vector y.

8. A method for determining a channel response comprising:
   determining a matrix $\Gamma$ based on a correlation of a received signal and a known training sequence;
   extracting a vector y from a received signal; and,
   estimating the channel response from a least-squares solution based on the matrix $\Gamma$, the vector Y, and a matrix A formed from the elements of the known training sequence, wherein the matrix $\Gamma$ is constructed with a number of zeros dependent on distances between peaks of the correlation.

9. The method of claim 8 wherein the channel response has a pulse shape, and wherein the matrix $\Gamma$ is constructed so as to approximate the pulse shape of the channel response.

10. The method of claim 9 wherein the matrix $\Gamma$ comprises three sets of samples derived from the pulse shape, wherein the samples have a period T, wherein the first set comprises the pulse shape samples shifted by +T/2, wherein the second set comprises the pulse shape samples not shifted, and wherein the third set comprises the pulse shape samples shifted by −T/2.

11. The method of claim 10 wherein the pulse shape from which the samples are derived comprises a complex raised cosine pulse shape.

12. A method for determining a channel response comprising:
   determining a matrix $\Gamma$ based on a correlation of a received signal and a known training sequence;
   extracting a vector y from a received signal;

determining an unknown coefficient vector $\gamma_{LS}$ according to the following equation:

$$\gamma_{LS}=(\Gamma^H A^H A\Gamma)^{-1}\Gamma^H A^H y$$

wherein the unknown coefficient vector $\gamma_{LS}$ comprises a least-squares solution of the following equation:

$$y=A\Gamma\gamma+v$$

and wherein A comprises a matrix based on the training sequence; and, determining a channel response according to the following equation:

$$\hat{h}_{new}=\Gamma\gamma_{LS}.$$

13. The method of claim 12 wherein the channel response has a pulse shape, and wherein the matrix $\Gamma$ is constructed so as to approximate the pulse shape of the channel response.

14. The method of claim 13 wherein the matrix $\Gamma$ comprises three sets of samples $p_{-1}$, $p_0$, and $p_{+1}$ derived from the pulse shape, wherein the samples have a period T, wherein the first set $p_{-1}$ comprises the pulse shape samples shifted by $+T/2$, wherein the second set $p_0$ comprises the pulse shape samples not shifted, and wherein the third set $p_{+1}$ comprises the pulse shape samples shifted by $-T/2$.

15. The method of claim 14 wherein the pulse shape comprises a complex raised cosine pulse shape.

16. The method of claim 14 wherein the matrix $\Gamma$ comprises an approximated pulse shape P formed by concatenating $p_{-1}$, $p_0$, and $p_{+1}$.

17. The method of claim 16 wherein the matrix $\Gamma$ is given by the following equation:

$$\Gamma = \begin{bmatrix} P & \theta_{(D_K^a-D_{K-1}^a)\times 3} & & & & \\ \theta_{(D_K^a+D_L^c)\times 3} & P & \ddots & \theta_{D_K^a\times 3} & & \\ & \theta_{(D_L^c+D_{K-1}^a)\times 3} & P & \theta_{(D_K^a+D_{L-1}^c)\times 3} & & \\ & & \theta_{D_L^c\times 3} & \ddots & P & \theta_{(D_K^a+D_L^c)\times 3} \\ & & & & \theta_{(D_L^c-D_{L-1}^c)\times 3} & P \end{bmatrix}$$

wherein the zero matrices are dependent on distances D between peaks of the correlation, wherein the superscript a denotes a distance of a corresponding anti-causal peak, wherein the superscript c denotes a distance of a corresponding causal peak, wherein K denotes the number of anti-causal peaks, and wherein L denotes the number of causal peaks.

18. The method of claim 17 wherein the pulse shape comprises a complex raised cosine pulse shape.

19. The method of claim 12 wherein the matrix A is given by the following equation:

$$A = \begin{bmatrix} a_{N_c+N_a} & a_{N_c+N_a-1} & \cdots & a_0 \\ a_{N_c+N_a+1} & a_{N_c+N_a} & \cdots & a_1 \\ \vdots & \vdots & \ddots & \vdots \\ a_{N-1} & a_{N-2} & \cdots & a_{N-1-N_a-N_c} \end{bmatrix}_{(N-N_a-N_c)\times(N_a+N_c+1)}$$

wherein $a_i$ comprise training symbols, wherein N comprises the number of training symbols, wherein $N_a$ comprises the number of anti-causal peaks in the correlation, and wherein $N_c$ comprises the number of causal peaks in the correlation.

20. The method of claim 19 wherein the channel response has a pulse shape, and wherein the matrix $\Gamma$ is constructed so as to approximate the pulse shape of the channel response.

21. The method of claim 20 wherein the matrix $\Gamma$ comprises three sets of samples $p_{-1}$, $p_0$, and $p_{+1}$ derived from the pulse shape, wherein the samples have a period T, wherein the first set $p_{-1}$ comprises the pulse shape samples shifted by $+T/2$, wherein the second set $p_0$ comprises the pulse shape samples not shifted, and wherein the third set $p_{+1}$ comprises the pulse shape samples shifted by $-T/2$.

22. The method of claim 21 wherein the pulse shape comprises a complex raised cosine pulse shape.

23. The method of claim 21 wherein the matrix $\Gamma$ comprises an approximated pulse shape P formed by concatenating $p_{-1}$, $p_0$, and $p_{+1}$.

24. The method of claim 23 wherein the matrix $\Gamma$ is given by the following equation:

$$\Gamma = \begin{bmatrix} P & \theta_{(D_K^a-D_{K-1}^a)\times 3} & & & & \\ \theta_{(D_K^a+D_L^c)\times 3} & P & \ddots & \theta_{D_K^a\times 3} & & \\ & \theta_{(D_L^c+D_{K-1}^a)\times 3} & P & \theta_{(D_K^a+D_{L-1}^c)\times 3} & & \\ & & \theta_{D_L^c\times 3} & \ddots & P & \theta_{(D_K^a+D_L^c)\times 3} \\ & & & & \theta_{(D_L^c-D_{L-1}^c)\times 3} & P \end{bmatrix}$$

wherein the zero matrices are dependent on distances D between peaks of the correlation, wherein the superscript a denotes a distance of a corresponding anti-causal peak, wherein the superscript c denotes a distance of a corresponding causal peak, wherein K denotes the number of anti-causal peaks, and wherein L denotes the number of causal peaks.

25. The method of claim 24 wherein the pulse shape comprises a complex raised cosine pulse shape.

26. The method of claim 12 further comprising solving the equation for the unknown coefficient vector $\lambda_{LS}$ using a singular value decomposition method.

27. The method of claim 12 further comprising solving the equation for the unknown coefficient vector $\lambda_{LS}$ using a conjugate gradient method.

28. The method of claim 12 further comprising determining initial tap weights for an equalizer based on the channel response.

29. The method of claim 12 further comprising determining the initial tap weights for the equalizer based on the channel response $\hat{h}_{new}$ and a noise variance $\sigma_v^2$ given by the following equation:

$$\hat{\sigma}_v^2 = \frac{1}{N-D_K^a-N_L^c}\|\tilde{y}-y\|^2$$

wherein D denotes distance between peaks of the correlation, wherein the superscript a denotes a distance of a corresponding anti-causal peak, wherein the superscript c denotes a distance of a corresponding causal peak, wherein K denotes the number of anti-causal peaks, wherein L denotes the number of causal peaks, wherein N denotes a number of training symbols in the training sequence, and wherein $\hat{y}$ is based on the vector y.

30. A method for determining a channel response comprising:
  correlating a received signal with a training sequence;
  constructing a matrix $\Gamma$ by approximating a desired pulse shape for each peak of the correlation;
  constructing a matrix A based on the training sequence;
  solving a least-squares solution of the following equation in order to derive an unknown coefficient vector $\gamma$:

$y = A\Gamma\gamma$ wherein y is a vector representing a received signal; and,
  determining the channel response from the unknown coefficient vector $\gamma$ and the matrix $\Gamma$.

31. The method of claim 30 wherein the matrix $\Gamma$ is based on three sets of samples derived from the desired pulse shape, wherein the samples have a period T, wherein the first set comprises the pulse shape samples shifted by +T/2, wherein the second set comprises the pulse shape samples not shifted, and wherein the third set comprises the pulse shape samples shifted by −T/2.

32. The method of claim 31 wherein the desired pulse shape comprises a complex raised cosine pulse shape.

33. The method of claim 30 wherein the matrix $\Gamma$ is constructed with a number of zeros dependent on distances between peaks of the correlation.

34. The method of claim 30 wherein the determining of the channel response from the unknown coefficient vector $\gamma$ and the matrix $\Gamma$ comprises multiplying the matrix $\Gamma$ by the unknown coefficient vector $\gamma$.

35. The method of claim 30 wherein the desired pulse shape comprises a complex raised cosine pulse shape.

36. The method of claim 30 wherein the solving of the least-squares solution comprises solving the least-squares solution using a singular value decomposition method.

37. The method of claim 30 wherein the solving of the least-squares solution comprises solving the least-squares solution using a conjugate gradient method.

38. The method of claim 30 further comprising adjusting the tap weights of the taps of the equalizer based on the channel response.

39. The method of claim 30 further comprising determining the initial tap weights for the equalizer based on the channel response and a noise variance $\sigma_v^2$ given by the following equation:

$$\hat{\sigma}_v^2 = \frac{1}{N - D_K^a - N_L^c} \| \tilde{y} - y \|^2$$

wherein D denotes distance between peaks of the correlation, wherein the superscript a denotes a distance of a corresponding anti-causal peak, wherein the superscript c denotes a distance of a corresponding causal peak, wherein K denotes the number of anti-causal peaks, wherein L denotes the number of causal peaks, wherein N denotes a number of training symbols in the training sequence, and wherein $\hat{y}$ is based on the vector y.

* * * * *